Jan. 30, 1940.  G. W. HANLON  2,188,657
FILM FIRE QUENCHING AND MINIMIZING APPARATUS
Filed Nov. 8, 1937    3 Sheets-Sheet 1
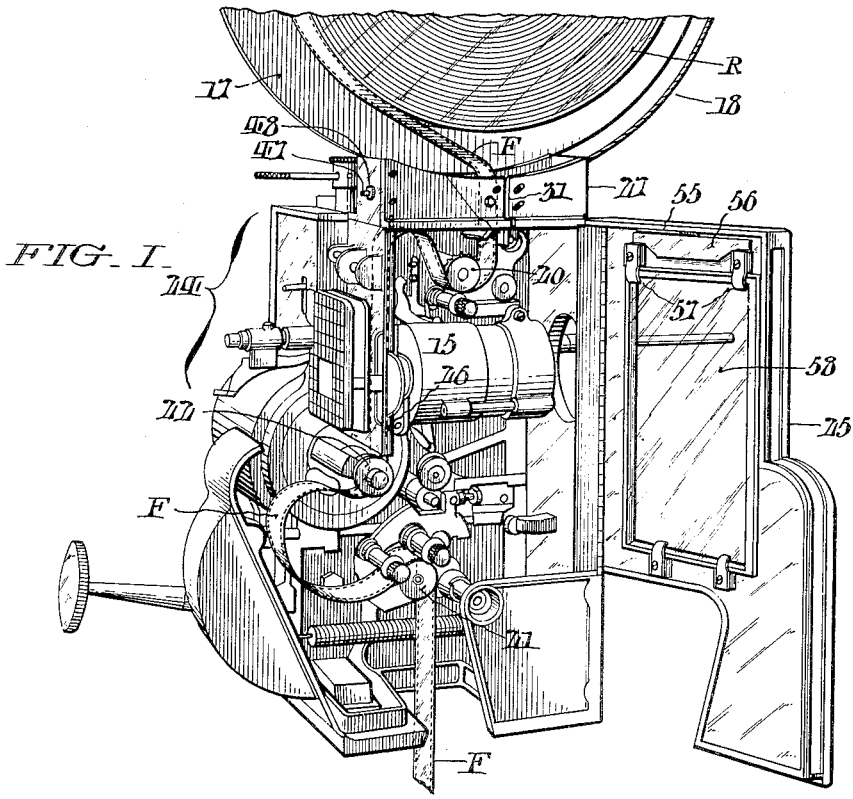
FIG. I.
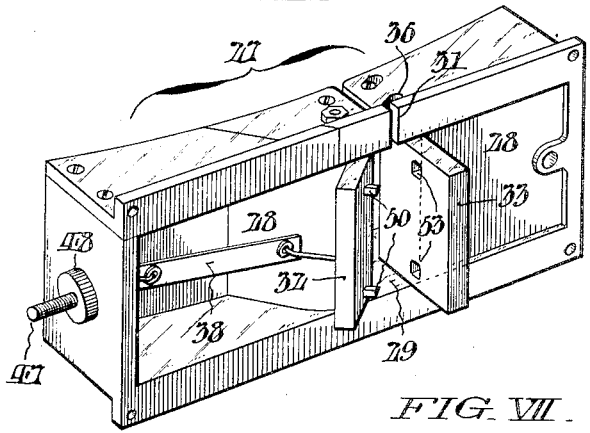
FIG. VI.
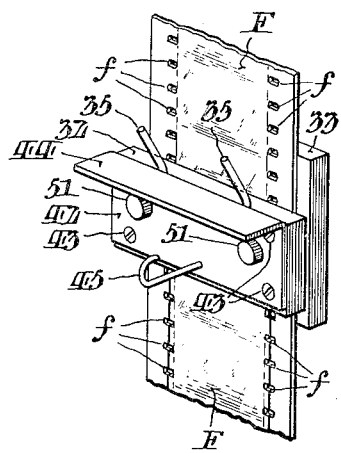
FIG. IX.
FIG. VII.
WITNESSES:
Thomas W. Kerr, Jr.
Claud Davidson
INVENTOR:
George W. Hanlon,
BY Paul & Paul
ATTORNEYS.

Jan. 30, 1940. G. W. HANLON 2,188,657
FILM FIRE QUENCHING AND MINIMIZING APPARATUS
Filed Nov. 8, 1937 3 Sheets-Sheet 2
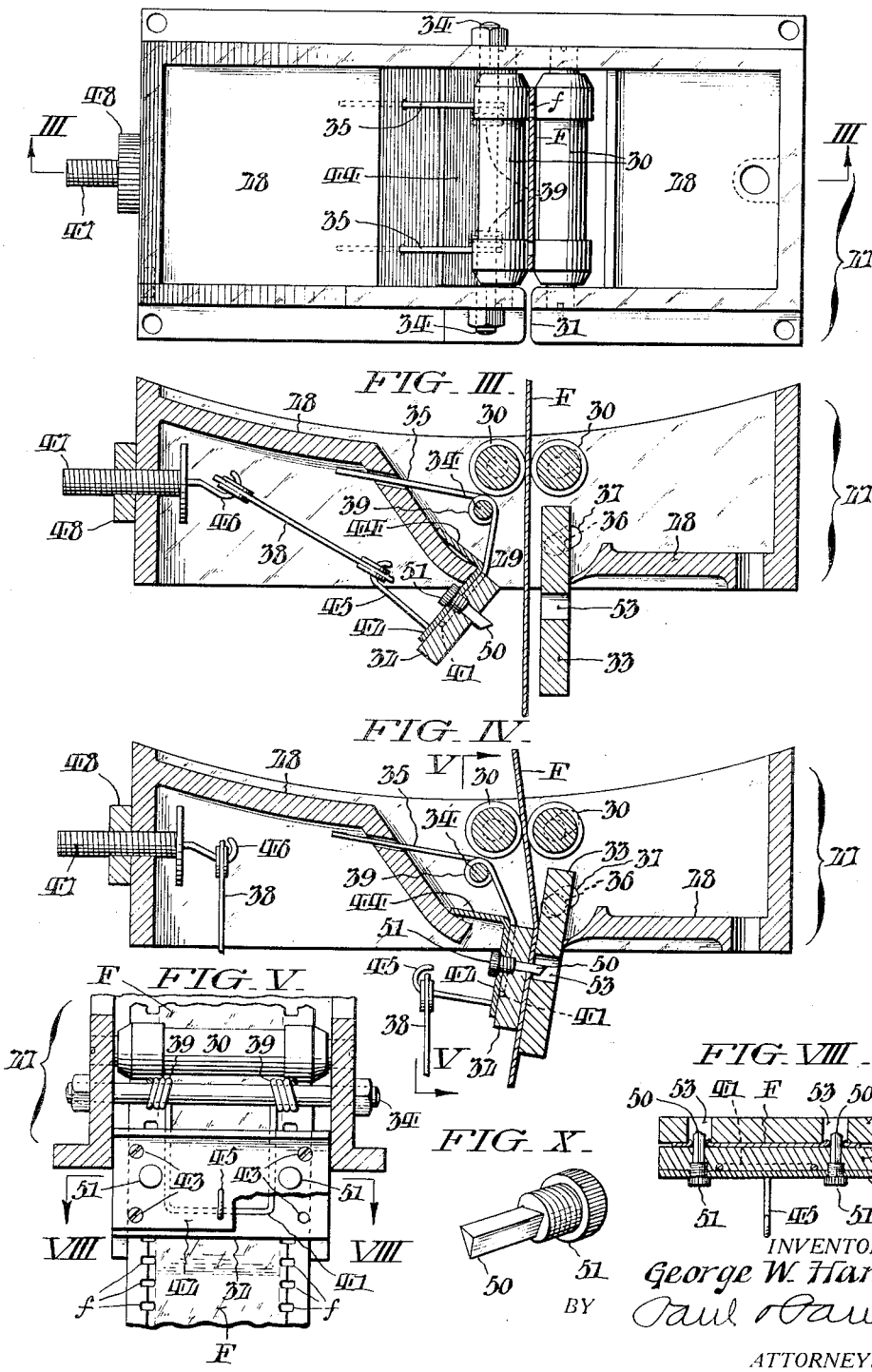
INVENTOR:
George W. Hanlon
BY Paul & Paul
ATTORNEYS.

Jan. 30, 1940.　　　G. W. HANLON　　　2,188,657
FILM FIRE QUENCHING AND MINIMIZING APPARATUS
Filed Nov. 8, 1937　　　3 Sheets-Sheet 3
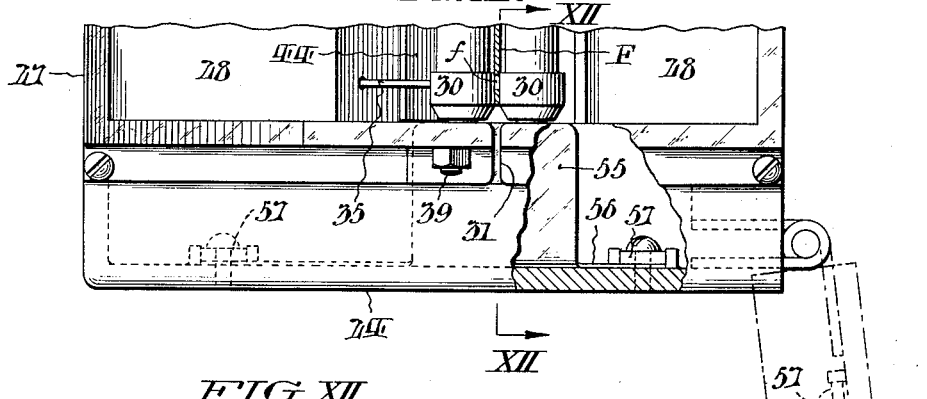
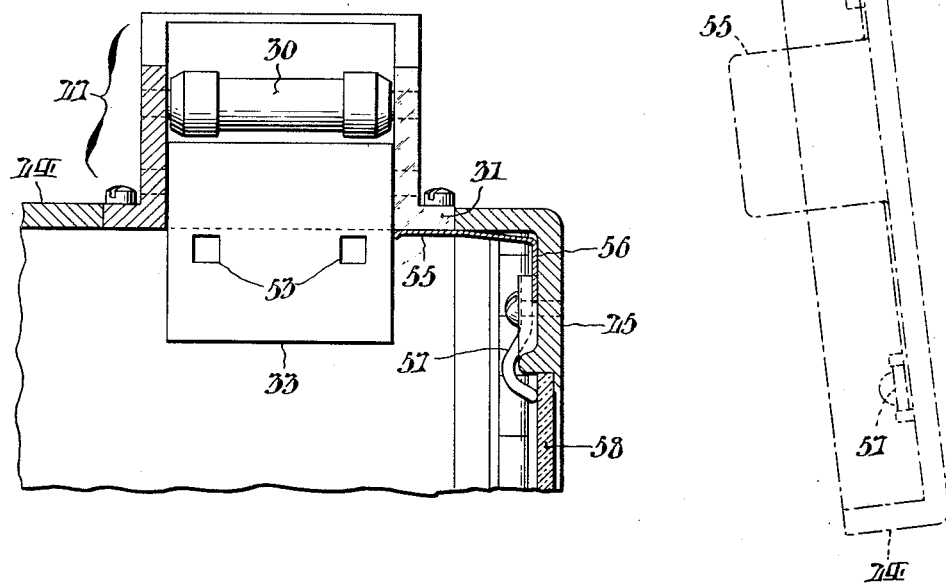
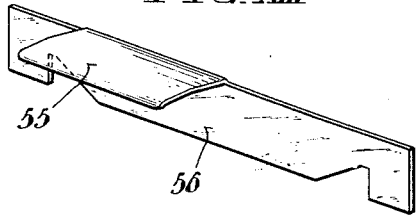
WITNESSES:
Thomas W. Kerr, Jr.
Claud Davidson
INVENTOR:
George W. Hanlon,
BY Paul & Paul
ATTORNEYS.

Patented Jan. 30, 1940

2,188,657

UNITED STATES PATENT OFFICE 2,188,657

FILM FIRE QUENCHING AND MINIMIZING APPARATUS

George W. Hanlon, Darby, Pa.

Application November 8, 1937, Serial No. 173,348

10 Claims. (Cl. 169—2)

This invention relates to fire protection in connection with motion film and the like, and is hereinafter explained with special reference to motion picture projection apparatus. The aim of the invention is to minimize film fires, and the damage and inconvenience resulting from them, including the injury to the particular film that takes fire.

Various safety devices for preventing the ignition of films in motion picture projectors have been proposed or used; but from a variety of causes, they are all sometimes ineffective, so that such film fires still occur. It is the object of this invention to provide protection by extinguishing fires quickly and keeping them from spreading. By promptly extinguishing such fires, and preventing their transmission from the projecting device proper to the magazine containing the unused reel of film, loss of this reel is prevented, as well as serious damage to the apparatus, injury to operators, and even panic and consequent injury amongst the audience,— to say nothing of possible burning of a theatre. With the damage to the film strictly limited, the showing of the film that caught fire may even go on (with slight loss of continuity), after a short intermission.

Other features and advantages of the invention will become apparent from the following description of a species or form of embodiment, and from the drawings. All the features and combinations shown or described, so far as they are novel over the prior art, constitute my invention.

In the drawings,

Fig. I is a perspective view of a motion picture projection apparatus embodying this invention in preferred form.

Fig. II is a plan view of the chamber at the top of the projection apparatus, with a superjacent film magazine removed.

Fig. III shows a vertical longitudinal section through the fire protection mechanism, taken as indicated by the line and arrows III—III in Fig. II.

Fig. IV is a view similar to Fig. III, with the parts shown in the positions occupied when the mechanism is functioning to quench a fire.

Fig. V shows a transverse section taken as indicated by the line and arrows V—V in Fig. IV.

Fig. VI is an inverted perspective view of the fire-protection mechanism proper.

Fig. VII shows a longitudinal section through a fuse link.

Fig. VIII shows a transverse section through a film clamping device, taken as indicated by the line and arrows VIII—VIII in Fig. V.

Fig. IX is a perspective view of the film clamping device.

Fig. X is a perspective view of a film cutting device.

Fig. XI is a fragmentary plan view of the picture projecting apparatus with certain parts broken out and shown in section.

Fig. XII shows a vertical section taken as indicated by the line and arrows XII—XII in Fig. XI.

Fig. XIII is a perspective view of a guard member.

Fig. I illustrates an ordinary type of motion picture projector apparatus, comprising a light-projecting device or unit 15 behind which the film F travels. Coming from a roll R on a reel 17 in (or on) a supply magazine (or support) 18 above, the strip of film F is drawn downward by feed devices 20, 21, one above the light-projecting unit 15, and the other below it, and both usually continuous in their action. There is also shown an intermediate feed device 22, usually intermittent-acting. These devices 20, 21, 22 are driven from any suitable source of power (such as an electric motor). Between the intermittent device 22 and each of the devices 20 and 21, the film F extends in a loop or loose run, which continually varies in length as the device 22 alternately feeds and hestitates. The light-projecting unit 15 and the feed devices 20, 21, 22, etc., are enclosed in a chamber or casing 24. This casing 24 has a horizontally swinging door 25, here shown in open position. In its downward travel through the narrow space between the back of the projecting unit 15 and the casing wall, the film F may travel in a guideway 26. From the lower feed device 21, the film F travels on down through an opening in the bottom of the casing 24, usually through a sound-pick-up, and ultimately to a receiving magazine (not shown). As here shown, the feed devices 20, 21, 22 include revolving feed rolls with peripheral feed projections or teeth for engaging feed shoulders on the film F, formed by series of perforations $f, f$ in its margins.

The projector apparatus and its parts and features that have been described are not in themselves of my invention, which is applicable to projectors of widely different construction and operation.

In its travel forward (to the left) through the region over the light-projecting unit 15, as well as downward in back of this unit, the film F is necessarily affected by the heat from the unit, which sometimes becomes so excessive as to ignite the film. When this happens, the fire tends to travel along the film F, and upward to the magazine 18 and the roll of film R. This is sometimes large enough to produce great volumes of smoke and considerable heat, which may injure the projector and the operators, and set fire to anything inflammable that may be nearby. The tendency of the fire to travel downward along the film F is less, and the various rollers, film guides, shoes and sprockets through which the film must pass in its further travel serve to extinguish the flame before it can reach the roll of film in the receiving magazine (not shown). Even if the fire is prevented from passing up into the magazine 18, it continues to consume the film F fed into the chamber 24 while the motor and the parts driven thereby are slowing down and stopping, after the operator shuts off the power. The present invention aims to prevent further feeding of the film F after it becomes ignited, and to prevent the fire from reaching the magazine 18 or the film roll R, and serves to extinguish the fire promptly.

As shown in Fig. I, the upper side of the casing 24 bounding the opening for the door 25 comprises a frame-like structure 27, curved at its top in conformity to the supply roll support or magazine 18. Across the interior of the frame structure 27 (Figs. II–IV and VI), there is a wall or septum 28 that separates the magazine 18 from the casing 24, except for an opening 29 through which the film F passes, preferably under guidance of idle guide-rolls 30, 30 mounted in the frame above the septum. To facilitate placing the film F in the opening 29 and between the rolls 30, 30, the frame structure 27 may have a vertical slot 31 in its side adjacent the door 25, as shown in Figs. I, VI, XI and XII. For extinguishing the burning film and preventing the fire from traveling up through the opening 29, fire pads or "clamp" plates 32, 33 (of metal or other refractory or heat-resistant material) are arranged at opposite sides of the film F, in or below the opening, to be brought together or "clamped" on the film when the latter becomes ignited, or when the heat affecting it becomes excessive.

In the present instance, the pads 32, 33 are brought together on the film F by moving the left-hand pad 32 against the right-hand pad 33, which may be arranged to swing or tilt somewhat to assure proper engagement of the pads over their entire surfaces. For this purpose, the pad 32 is shown mounted to swing on arms 35, 35 about a superjacent axis or pivot-shaft 34 mounted in the sides of the frame 27, while the pad 33 has trunnion pins 36 near its upper edge, that engage in slots 37 in the sides of the frame. These slots 37 extend more or less horizontally or diagonally, to allow the pad 33 to swing or pivot against the corresponding edge of the opening 29. In this particular construction, the pad 32 operates suddenly with a trigger action, being constantly spring-urged toward the pad 33, but normally held away from it by a heat-responsive device, shown as a "fuse" link 38 that will be disintegrated or rendered ineffective by fire. As best shown in Figs. III, IV, and V, the arms 35 form part of wire springs 39 whose mid-portions are helically bent in a number of turns around the pivot shaft 34, and whose ends act against the wall 28, being engaged in holes in it. Both the arms 35 and the rest of the springs 39 are shown as made of one length of wire, whose U-bent mid-portion 41 is engaged in a U-recess in the pad 32, and secured by a plate 42 fastened to the pad by screws 43. As shown in Figs. III and IV, provision is made for completing the closure of opening 29, when pad 32 closes against pad 33 and forces the latter against the right-hand edge of opening 29, by means of a flange 44 on pad 32 (or its plate 42) whose edge lies and moves adjacent or in contact with a part of wall 28 that is curved concentrically with pivot-shaft 34.

The link 38 has its apertured ends hooked over a hook 45 attached to the plate 42, and over a hook 46 carried by an adjustable screw 47 screwed into the frame 27, and provided with a lock-nut 48. To bring the pads 32, 33 together and close the opening 29 when the film F burns, the link 38 may be made of combustible material (like stout paper, cardboard, or fiber) that will be ignited and burned by burning of the film F, or of fusible metal that will be melted through by the heat of the burning film, or of any other material that will disintegrate or lose its strength under such heat. Or if it is desired to play safe by closing the opening at 29 whenever the heat (from device 15) affecting the film becomes excessive, or materially greater than usual, the link 38 may be of lower-fusing metal, for example, that will give way under such heat, even before the film F can actually ignite. The link 38 is shown in section in Fig. VII.

To prevent the film F from continuing to feed down from magazine 18 to the fire in the chamber or casing 24 after the pads 32, 33 have come together and closed the opening 29, provision may be made to stop the film feed or render the feeding device 20 ineffectual when the film becomes ignited. One way of doing this is to cut the film F above the feed device 20. As shown in Figs. III, IV, VI, VIII, and IX, knives 50, 50 are arranged to cut through or cut away the margin of the film F where the feed-holes f, f are, so that the feed teeth of the device 20 shall obtain no effective hold on the film. These knives 50, 50 are shown as parts of screws 51 that are threaded into the pad 32, so as to extend through this pad and project beyond its surface. They are shown of triangular section, with beveled ends (Figs. IV and X). When the pads 32, 33 come together, the ends of these knives 50, 50 pierce the film F and enter holes 53, 53 in the pad 33 so that their sharp edges cut through the film along the series of feed holes f, f, as shown in Fig. IX. As soon as the cuts reach the feed device 20, the feed of the film F ceases instantly. Thus the amount of film F that can be burned is minimized.

While the film F is shown narrower than the internal width of the frame 27, the pads 32, 33 and flange 44 extend the full width of the frame, with just sufficient clearance to let them move easily. Hence when the pads 32, 33 come together, the opening 29 is closed completely. To obviate any possibility that the fire may work past the edges of the pads 32, 33, through the slot 31, provision may be made for closing this slot after the film F has been inserted through it into the opening 29. For this purpose, there is shown in Figs. I and XI–XIII a flange or guard 55 on the door 25, which fits against the flanged lower edge of the frame 27 under the slot 31 when the door is closed. As here shown, the flange or lug 55 is formed by an inbent portion of a sheet metal strip 56, whose ends may be secured to the door by the clamps 57 that hold in place the glass 58 at a window in the door 25.

Having thus described my invention, I claim:

1. The combination with motion film apparatus including film feeding means, fire pads at opposite sides of the traveling film, and means for bringing them together on the film, of cutting means carried by one of said pads for acting on the film to render said feeding means ineffective when said pads are brought together.

2. The combination with motion film apparatus including film feeding means, fire pads at opposite sides of the film in advance of said feeding means, and means for bringing said pads together on the film, of means for cutting the film to render said feeding means ineffective carried by one of said pads and brought into action by their coming together.

3. The combination with motion film apparatus including film feeding means, fire pads at opposite sides of the film in advance of said feeding means, and means for bringing said pads together on the film, of means for cutting the film to render said feeding means ineffective comprising a blade carried by one of said pads and an opening for receiving said blade in the other pad.

4. The combination with motion film apparatus including feeding means for engaging feed shoulders on the film, fire pads at opposite sides of the film in advance of said feeding means, and means for bringing said pads together on the film, of means for also cutting away said shoulders in advance of said feeding means when the pads are brought together, and thus preventing the film from being dragged through the pads.

5. The combination with motion film apparatus including feeding means for engaging feed shoulders on the film, fire pads at opposite sides of the film in advance of said feeding means, and means for bringing said pads together on the film, of means for cutting away said shoulders comprising blades on one of said pads and openings for receiving said blades in the other pad.

6. The combination with motion film apparatus including feeding means for engaging in rows of holes along the margins of the film, fire pads at opposite sides of the film in advance of said feeding means, and means for bringing said pads together on the film, of blades on one of said pads for cutting through the film margins along the rows of holes, and openings for receiving said blades in the other pads, so that when the pads are brought together, the blades are projected through the apertured film margins into position for cutting them as aforesaid.

7. The combination with motion film apparatus including a region wherein the film is liable to be ignited, and feeding means for engaging feed shoulders on the film and feeding the film through the apparatus and its said region, of means for cutting away said feed shoulders in advance of the means for feeding the film into said region, and means for bringing said cutting means into action in response to burning of the film.

8. The combination with motion film apparatus including feeding means for engaging feed shoulders along the margin of the film, of blades for cutting away said feed shoulders in advance of the said feeding means, and means responsive to burning of the film for bringing said blades into the path of travel of the feed shoulders, so that the latter shall be cut away by the feed movement of the film.

9. The combination with motion film apparatus including feeding means for engaging in rows of holes along the margins of the film, of blades for cutting through the film margins along the rows of holes, and means for projecting said blades through the apertured film margins into position for cutting them as aforesaid when the film burns.

10. The combination with motion film apparatus including a chamber traversed by the film wherein it is liable to become ignited, and an associated film magazine, with a wall separating said chamber from said magazine, and an opening in said wall for the travel of the film between said chamber and magazine, of means for closing said opening comprising coacting fire pads therein, means for swinging one of said pads against the other and thus bringing them together on the film, and means movably supporting said other pad with freedom to tilt against the edge of the opening when engaged by the swinging pad, so that the film is pressed evenly against said other pad by the swinging pad.

GEORGE W. HANLON.